Aug. 12, 1969    F. O. BLEY ETAL    3,460,891
IDENTIFICATION CAMERA

Filed Sept. 26, 1966                                        6 Sheets-Sheet 1

INVENTORS.
FREDERICK O. BLEY
MARTIN STRAUSS
BY Burns, Doane, Benedict,
Swecker & Mathis
ATTORNEYS.

Aug. 12, 1969  F. O. BLEY ETAL  3,460,891
IDENTIFICATION CAMERA
Filed Sept. 26, 1966  6 Sheets-Sheet 4

INVENTORS.
FREDERICK O. BLEY
MARTIN STRAUSS
BY
Burns, Doane, Benedict, Swecker & Mathis
ATTORNEYS.

3,460,891
IDENTIFICATION CAMERA
Frederick O. Bley, Alexandria, Va., and Martin Strauss, Chevy Chase, Md., assignors to First Foto, Inc., a corporation of Missouri
Filed Sept. 26, 1966, Ser. No. 581,965
Int. Cl. G03b 29/00
U.S. Cl. 355—29         15 Claims

ABSTRACT OF THE DISCLOSURE

A camera for making color identification photographs of newborn babies includes a large roll film supply and a cassette for receiving relatively short strips of exposed film. A film exposure station is located between the supply and the cassette. When an empty cassette is secured in the camera housing, means are automatically actuated for feeding the free end of the film strip from the supply roll into the cassette. At any time thereafter the cassette may be removed. The cassette releasing manipulations automatically cause an extra length of the film strip to be advanced into the cassette to assure that the last exposed frame will be located within the cassette, automatically cause severance of the film strip leading into the cassette and automatically cause closure of the cassette to light. An opening in the camera receives an identification card bearing indicia to be reproduced on the exposed film along with the picture of the baby, and electrical control means prevent operation of the camera in the absence of a properly positioned identification card. Camera operation also is prevented in the absence of adequate flash lamp energization potential and when the cassette has been filled.

---

This invention relates to an identification camera of the type utilized to record the likeness and identity of selected individuals in the form of a succession of exposures on a strip of photographic film. The invention is particularly suitable for use in producing color photographic pictures of individual babies in a hospital.

It has become common for hospitals to utilize identification cameras to record the likenesses of babies born in the hospital, for record purposes, and also as a service to parents who may wish to have photographs of their babies. Typically, a camera installation is provided in an area of the hospital where newborn babies may be photographed soon after birth, and the actual exposures are taken by hospital personnel, such as nurses, whose primary duties have nothing to do with photography or photographic equipment. The task of servicing the equipment is carried out by an outside serviceman who periodically visits the hospital.

In utilizing an identification camera for these purposes it is particularly important that the photographic film should be removed from the camera for processing within a reasonably short time after exposure, in view of the relatively short period during which the majority of mothers and their babies remain in the hospital. On the other hand, the supply of unexposed film within the camera must be large, because busy hospital personnel ordinarily are neither willing nor sufficiently expert in the handling of the equipment to undertake frequent film loading operations. Thus, the number of births occurring in the short time period between successive removals of film from the camera is usually insufficient to necessitate the exposure of all the film in the camera with the result that at the time the film is to be removed, there will still be a substantial proportion of the film remaining unexposed.

In using the presently available identification photography equipment, much waste results from the film handling operations. Although some identification cameras are so constructed that it is not necessary to remove all of the film from the camera each time it is desired to collect the exposed film for processing, these require the attention of trained personnel. The camera constructions that make it commercially feasible for untrained hospital personnel to remove the exposed film are, on the other hand, wasteful from the standpoint of film consumption, in that all of the film, whether exposed or not, is removed at each collection operation. The cost of that part of the film wasted and/or the skilled labor required for collection must be included in the price charged to the ultimate purchasers of the processed photographs actually produced, as a wastage overhead. So far, however, such wastage overhead has not prevented the successful commercial operation of hospital baby photographic services because of the low relative cost of the black and white film generally in present use compared with the total of the other costs involved.

However, in providing a color photographic service for hospitals the wastage overhead becomes a major factor in total cost because of the high cost of color film. In almost all cases where color film has been used, film waste has proved to be so substantial as to make it impossible for hospital photographic services using the identification cameras available heretofore to provide color photographs of babies at a commercially attractive price.

It is therefore necessary, if identification photographs of babies are to be produced in color at a commercially attractive price, that the wastage of unexposed film remaining in the camera at the time of film removal be avoided. Moreover, the steps taken to minimize film wastage must not be such as to impose additional burdens on the hospital personnel or to require the employment of specially trained individuals in film collection operations.

It is also particularly important in utilizing color film in an identification camera that the successive exposures produced on the photographic film should have been made under conditions of uniform lighting if subsequent automatic processing providing lower overall costs is to be successfully employed. Even a slight variation in light output between successive exposures may result in certain of the frames being completely out of correct color balance after processing, thereby causing misleading and unattractive photographic reproductions. Such variations in lighting may arise in circumstances in which, as is common, an electronic flash unit is utilized to illuminate the subject individual at the moment of exposure. The flash devices frequently utilize a stored electric charge to operate the flash unit, which storage circuit may require an appreciable charging time between successive exposures. In conditions where successive numbers of exposures are being made of the same subject, the operator may be tempted to operate the camera between successive exposures before the storage circuit has recharged to a level sufficient to provide a uniform level of illumination.

Another necessary condition for the successful operation of an identification camera is that suitable identifying indicia should appear upon the same exposure frame as the likeness of the individual recorded. Certain prior structures have achieved this result by positioning an identifying card adjacent the subject individual within the area recorded by the camera. However, such prior structures have generally failed to guard against inadvertence of the operator either in forgetting to provide an identifying card at all or in placing the card in position in an incorrect orientation relative to the subject, in which case the desired information will not be properly recorded.

In recognition of the need for an improved identification camera of the type intended to record the likeness and identification of selected individuals, it is therefore a general object of the present invention to provide an identification camera which substantially obviates or minimizes problems such as those previously noted.

It is a particular object of the invention to provide an identification camera intended to produce successive exposures of selected subjects on photographic film, so uniquely constructed as to permit exposed portions of the film to be removed periodically from the camera for processing with a minimum wastage of the unexposed portion of the film remaining in the camera.

It is a further object of the invention to provide an identification camera suitable for use in photographing babies in a sterile area of a hospital which may be provided with fresh film in bulk without risk of contamination of the sterile area and from which relatively short lengths of exposed film may be conveniently removed from time to time by the hospital personnel.

Another object of the invention is to provide an identification camera that is virtually foolproof in operation and in which the various operationally significant sequences are established automatically, so that pictures of reliably high quality may be produced efficiently by untrained personnel.

In accordance with a preferred embodiment of the invention, an identification camera is provided with a novel combination of structural features and control circuits cooperating to assure realization of the above objects. The camera includes a large roll film supply and a removable cassette for receiving the free end of the strip of film coming from the supply. Power means serve to advance the film from the supply toward the cassette, and such means are controlled so as to correlate in a particularly desirable manner the film advancing motions with the various other activities involved in the identification photograph operations.

The construction is such that the manipulations required for removal of a film receiving cassette from the camera body automatically bring about, prior to actual withdrawal of the cassette, the operations required to advance the film strip so that the last exposure and a short length of unexposed film are positioned within the cassette, to sever the film strip leading to the cassette, and to close in a lighttight manner both the cassette and the opening between the cassette receiving chamber and the rest of the interior of the camera. Then, upon replacement of the full cassette with an empty one, another sequence of operations is automatically performed to thread the new cassette with film from the supply within the camera body and condition the camera for use in the making of exposures.

In a preferred embodiment the camera housing includes two separable bodies. One body, containing the optical and associated exposure producing means remains permanently located in the picture taking location. The other body, containing the film supply, the film advance mechanism and the receiving container, may be brought, loaded with unexposed film, to the hospital and left there by the serviceman. It may then be transferred to the sterile area and engaged on the fixed body of the camera by hospital personnel and subsequently removed by them when necessary.

Other important aspects of the invention are directed to the prevention of exposure in conditions which would result in unsatisfactory photographic reproductions. One such aspect involves the provision of a power operated shutter and sequentially operable shutter connection means responsive to successive operations of the shutter for connecting the shutter to a source of external power for a predetermined number of operations of the shutter. The shutter connection means disconnects the source of power from the shutter on completion of the predetermined number of operations thereof, so that no additional exposures can be made. The predetermined number of operations of the shutter is less than the maximum number of frame lengths of film that may be received in the cassette without overfilling of the cassette.

Provisions also are made for assuring proper lighting conditions at the time each exposure is made. A flash unit is operated by an electrical stored charge circuit and operatively connected with the shutter so that the flash unit operates concurrently with the shutter. A flash unit sensor senses the charge level of the stored charge circuit and is operatively connected with the shutter means for preventing operation of the shutter means when the charge level of the stored charge circuit is below a predetermined level necessary to ensure adequate and uniform illumination.

One additional aspect of the invention resides in the provision of an identification card sensor for ensuring the presence within the camera of a card bearing indicia identifying the next successive exposure. The card sensor is operatively connected to the shutter means for preventing operation thereof in the absence of a card. Additionally, orienting means utilized in conjunction with geometrically asymmetrical cards, is provided in order to ensure that the card sensor may sense the presence of the card only when the card is present in an orientation relative to the camera in which the indicia on the card will be reproduced on the film.

A preferred embodiment of the invention is illustrated in the accompanying drawings, in which.

Figure 1:
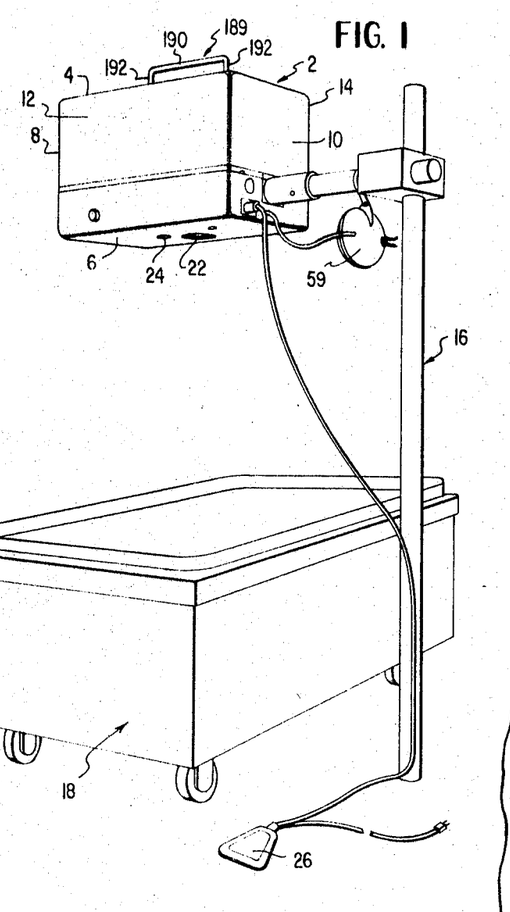
FIGURE 1 is a perspective view of one preferred embodiment of an identification camera according to the present invention, showing the camera mounted on a stand, above a bassinet of a type commonly used in hospitals.
Figure 2:
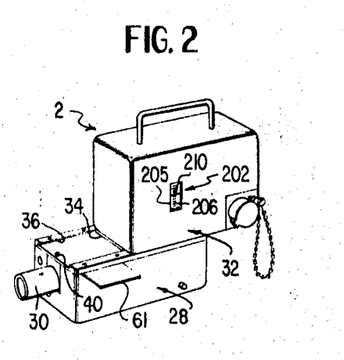
FIGURE 2 is a perspective view of the camera shown in FIGURE 1, showing the sliding connection between the upper and lower camera bodies.

Referring to FIGURES 1 and 2 of the drawings, the invention may be seen to comprise a generally rectangular camera housing 2 having upper and lower surfaces 4 and 6, forward and rear ends 8 and 10, and right and left sides 12 and 14, respectively. The camera is supported by a vertically extending support 16 permitting a conventional bassinet 18 to be moved beneath the camera and allowing the spacing of the camera above the upper surface of the bassinet 18 to be adjusted. A baby lying on the bassinet 18 may be accurately located beneath a lens aperture 22 in the lower surface of the housing by utilizing a beam of light controlled by a foot switch 26 projected downwardly through an aiming light aperture 24 in a manner to be described.

As shown in FIGURE 2, the camera housing 2 comprises a lower body 28 fixedly secured to the support 16 by a supporting collar 30. A removable upper body 32 is releasably secured to the lower body 28 by longitudinally extending, laterally spaced tongues 34 on the lower surface of the upper body 32 slidably engageable with two opposed, longitudinal grooves 36 on the upper surface of the lower body 28. The upper and lower bodies 32 and 28 are locked together during operation by a vertically moving connector 40.

The upper body 32 houses the film supply. When the film has been exhausted, or whenever reloading is desired, the upper body 32 may be slid off the fixed body 28 and taken to a location outside the sterile area where the babies are photographed for collection by the servicemen. At this time another upper body 32 brought by the serviceman, loaded with unexposed film, may be taken by the hospital personnel operating the camera and slid onto the fixed lower body. In this manner, it is not necessary for the serviceman himself to enter the sterile area to load the film or for the hospital personnel to disturb the basic camera installation.

THE LOWER BODY

Figure 3:
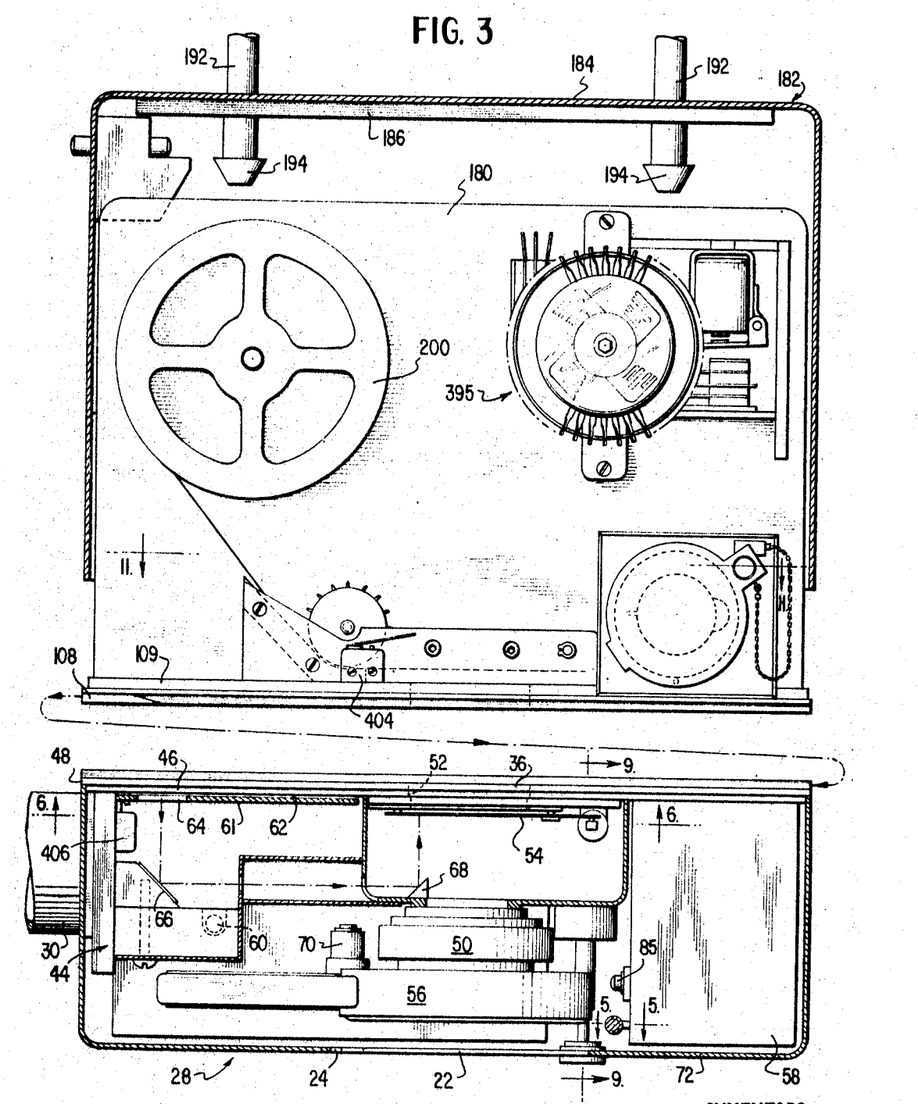
FIGURE 3 is a part-sectional side view from the left side of the identification camera shown in perspective in FIGURE 1 showing the upper and lower bodies of the camera in a separated condition.

Referring in more detail to FIGURE 3, the lower body 28 includes a rigid, open, generally rectangular frame 44 rigidly connected to the previously mentioned collar 30. A horizontal, rectangular top plate 46 forming a part of the frame 44 defines an upper surface of the lower body 28. Two longitudinally extending, laterally spaced side channels 48 on the upper surface of the top plate 46 are provided with the previously mentioned grooves 36.

A conventional, horizontally positioned camera lens 50 is supported by a portion of the frame 44 at approximately the longitudinal midpoint of the lower body 28. A laterally and longitudinally extending, rectangular aperture 52 is provided in the upper plate 46 vertically above the lens 50 to permit light to pass through to the upper body 32. Light is normally prevented from passing through the aperture 52 by a shutter 54 supported on the under surface of the plate 46.

An annular, electronic flash unit 56 surrounds the lens 50 and is supported by other portions of the frame 44 and is supplied with power by a power pack 58. The power pack 58 also supplies power for an external flash unit 59 positioned externally of the camera to provide side illumination for preventing the phenomenon of "pink eye" caused by reflection of the illumination provided by the annular flash unit 56 from the baby's eyeball and also supplies power to an identification card flash unit 60 so positioned within the lower body as to illuminate a card 61 upon operation of the unit 60.

The frame 44 also includes a horizontal card support plate 62 closely spaced beneath and parallel to the lower surface of the upper plate 46 extending forwardly from the rear end of the frame 44 adjacent the left side thereof. The spaced adjacent surfaces of the card support 62 and the top plate 46 define a card receiving slot 63 within which the identificaton card 61 (FIGURE 2) may be inserted. A laterally extending, generally rectangular aperture 65 adjacent the rear end of the support plate 62 (FIGURE 6) is aligned vertically above a rearwardly directed, laterally extending mirror 66 (FIGURE 3) supported at an angle of 45° to the horizontal by a portion of the frame 44. A prism 68 positioned on the frame 44 adjacent the lens 50 on the same horizontal level as the mirror 66 directs light received therefrom vertically upwardly through the aperture 52 in the plate 46 into the upper body 32 within the area of film exposure therein as described hereinafter.

Also within and supported on the frame 44 is an aiming light 70 positioned to cast a beam of light vertically downwardly upon actuation of the previously described foot switch 26.

The previously described elements supported by the frame 44 are enclosed within a removable generally rectangular, hollow housing 72 having an upper periphery adapted to engage the periphery of the top plate 46 in lighttight relation therewith. The casing 72 is provided with the previously described apertures 22 and 24 positioned vertically beneath the lens 50 and the aiming light 70.

Also provided in the lower body is a laterally extending, light conducting rod 74 (FIGURE 5) of lucite, or like material, having its opposed extremities projecting laterally through apertures 76 provided in the casing. The rod 74 is provided with an annular groove 78 adjacent one extremity thereof receiving an actuating pin 80 of a trigger switch 82 secured to a part of the frame 44. Lateral motion of the rod 74 by the operator causes the pin 80 to be moved radially outwardly of the groove 78 thereby actuating the trigger switch 82 to operate the camera in a manner to be described. Two opposing, centering springs 84 connected to the casing 72 and supporting the rod 74 horizontally, return the rod 74 to a centered position within the casing 72 after manual displacement of the rod 74 has ceased, in which the pin 80 rests in the groove 78.

Figure 5:
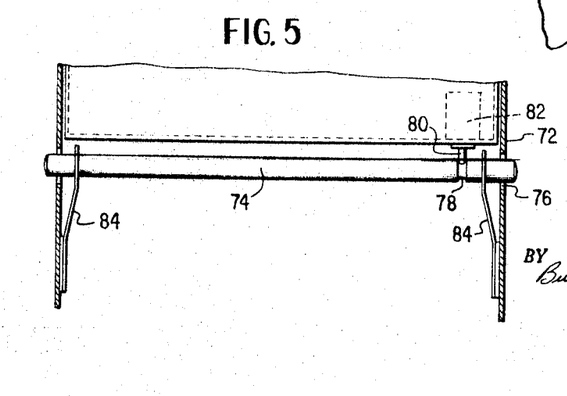
FIGURE 5 is a cross-sectional view of a portion of the identification camera of FIGURE 3, taken along the line 5—5 therein, showing the manually operable camera trigger.

A ready light 85 positioned on the frame 44 above and adjacent the rod 74 is illuminated automatically by the action of a ready light relay 86 when the camera is ready to take an exposure, as described hereinafter, and causes the extremities of the light conducting rod 74 projecting outside the casing to become illuminated thereby indicating to the operator that she may operate the camera.

Figures 6, 7, 8, 9:
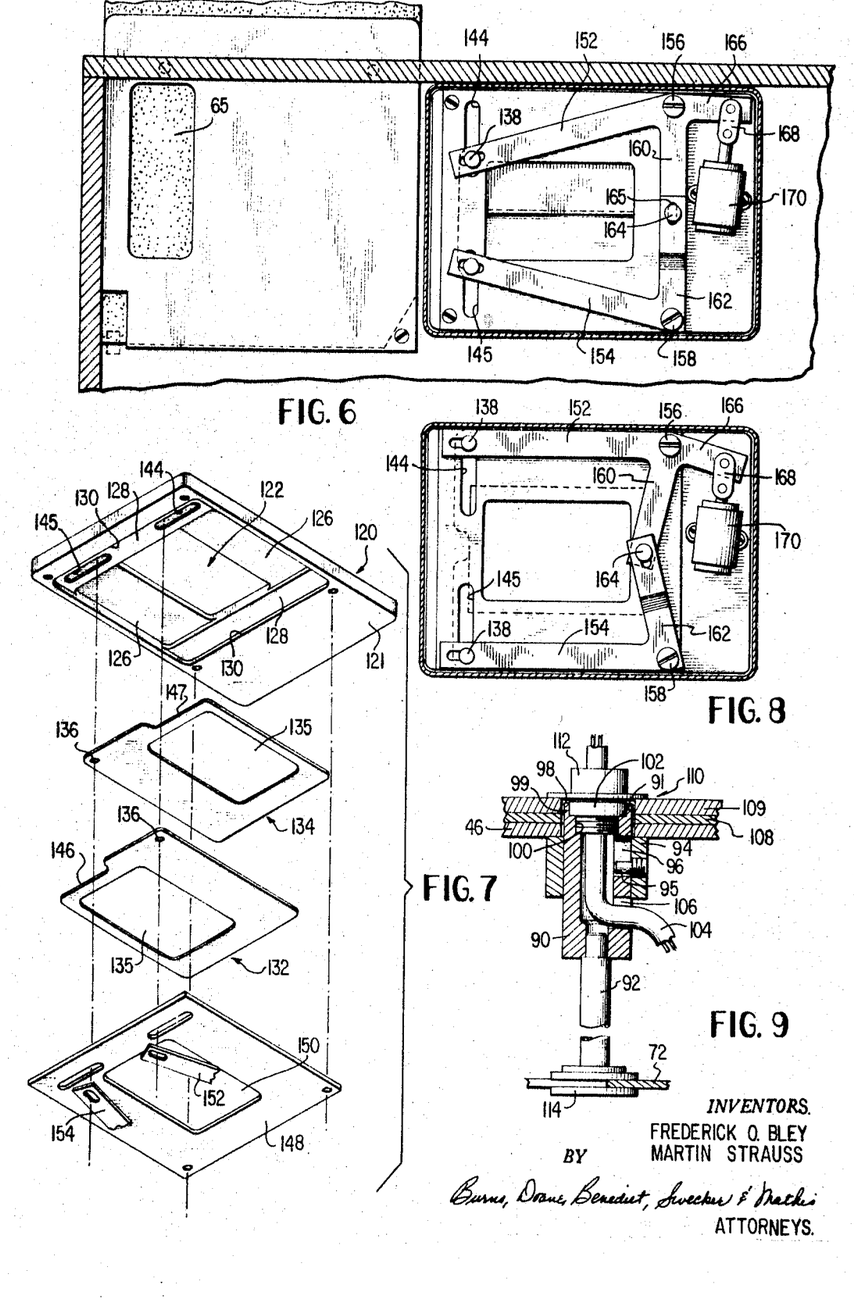
FIGURE 6 is a cross-sectional view of a portion of the identification camera of FIGURE 3, taken along the line 6—6 therein, showing the camera shutter in a closed position.
FIGURE 7 is an exploded perspective view of the camera shutter shown in FIGURE 6.
FIGURE 8 is a top view of the shutter shown in FIGURE 6, showing the shutter in the open position.
FIGURE 9 is a cross-sectional view of a portion of the camera shown in FIGURE 3, taken along the line 9—9 therein, showing the movable mechanical connection between the upper and lower camera bodies.

In order to prevent relative movement between the upper and lower bodies 32 and 28 respectively, the previously mentioned connector 40 is provided. As seen in FIGURE 9, the connector 40 comprises an annular, vertical tube 90 slidably movable through an aperture 91 in the top plate 46 and supporting a depending rod 92. An annular boss 94 secured to the under surface of the plate 46 extends about the aperture 91 and the annular tube 90 and supports a radially inwardly extending pin 95 received within a vertically extending slot 96 in an adjacent portion of the side wall of the tube 90. The tube 90 may move vertically from an inoperative position in which the upper end of the slot 96 rests on the pin 95 and in which an upper end 98 of the tube 90 is positioned slightly below the upper surface of the plate 46 to an operative position in which the upper end 98 of the tube 90 is positioned above the upper surface of the plate 46. The tube 90 may be rotated to advance the pin 95 into a horizontal channel in the tube 90 extending a short peripheral distance from the upper end of the vertical slot 96 to support the tube 90 in the operative position. Extending downwardly from the upper extremity 98 of the tube 90 and concentric therewith are internally threaded, upper and lower recesses 99 and 100 of relatively greater and lesser internal diameter respectively. A female electrical connector 102 having an upper surface generally flush with the end 98 of the tube 90 is threadedly secured within the recesses 99 and 100. An eletcrical cable 104 depends from the connector 102 and passes out of the tube 90 through a side aperture 106 therein. The upper body 32 includes a lower plate 108 slidably abutting the upper surface of the plate 46. A frame plate 109 is secured to the upper surface of the lower plate 108. An aperture 110 extending through the plates 108 and 109 is aligned vertically above the aperture 91 in the plate 46 when the upper and lower bodies 32 and 28 are engaged. Secured to the upper surface of the frame plate 109 is an electrical connector 112 having a male portion depending therefrom concentric with the aperture 110 but not extending vertically below the lower surface of the lower plate 108 adapted to matingly engage the female electrical connector 102 supported by the tube 90. The lower end of the rod 92 projects outwardly of the housing 72 and is provided with a knob 114.

In operation the upper body 32 is slidingly engaged with the lower body 28 by the mating tongues and grooves 34 and 36 and the aperture 110 aligned with the aperture 91. The knob 114 is then elevated to move the connector 102 upwardly into mating engagement with the connector 112 and is then rotated to move the pin 95 into the horizontal channel to retain the tube 90 in the operative position. In this manner positive mechanical connection of the upper and lower bodies is effected and at the same time electrical connection is provided between them.

THE SHUTTER

The lower body 28 also includes the previously described shutter 54 shown in FIGURES 6, 7, and 8. The shutter 54 includes a rectangular base 120 having a flat horizontal lower surface 121 and secured to the underside of the plate 46. The base 120 is provided with a rectangular slot 122 coextensive and aligned with the slot 52 in the plate 46. The base 120 also includes two recessed, longitudinal surfaces 126 extending along each longitudinal side of the slot 122 parallel to the lower surface 121. Two recessed lateral surfaces 128 extend along each lateral side of the slot 122. The lateral surfaces 128 are vertically intermediate and parallel to the longitudinal surfaces 126 and the lower surface 121. Perpendicular to and intersecting the surfaces 128 and 121 are two opposed, laterally extending shoulders 130. Left and right generally rectangular, overlapping shutter plates 132 and 134 provided with apertures 135 therein dimensionally similar to the aperture 122 may be aligned coincidentally therewith to provide an unimpeded light path through the shutter 54. The opposed longitudinal extremities of each of the shutter plates 132 and 134 abut adjacent, opposed shoulders 130 of the plate 122 to guide each of the shutter plates for lateral motion. The rear left extremity of the left shutter plate 132 and the rear right extremity of the right shutter plate 134 are each provided with an aperture 136, each adapted to receive a shutter pin 138.

The upper extremity of each pin 138 is received within one of two laterally extending, left and right guide channels 144 and 145 respectively recessed into the rear lateral surface 128. The channels 144 and 145 guide the pins 138 in a direction parallel to the shoulders 130 to facilitate parallel lateral sliding motion of the shutter plates 132 and 134. The rear longitudinal edges of each of the shutter plates 132 and 134 are provided with oppositely directed longitudinally recessed, laterally extending notches 146 and 147, respectively, extending on each shutter plate from approximately the lateral midpoint to that longitudinal edge not adjacent the pin hole 136 in the shutter plate. The notches 146 and 147 permit the shutter plates to slide relatively over each other without being prevented from so doing by the pin 138. A cover plate 148 provided with an aperture 150 coextensive and aligned with the aperture 122 is secured to the lower surface 121 of the base 120 to support the shutter plates 132 and 134 between the shoulders 130.

In order to move the shutter plates 132 and 134, left and right shutter arms 152 and 154, respectively, are provided. Each shutter arm is pivotally connected to one of the pins 138 and extends forwardly and laterally outwardly from one of two laterally opposed left and right points of pivotal connection 156 and 158 to the plate 120 adjacent the left and right sides respectively thereof. Opposed, laterally extending, overlapping left and right link arms 160 and 162 extend inwardly from and are secured to the left and right shutter arms 152 and 154, respectively, adjacent the pivot points 156 and 158. The link arms 160 and 162 are pivotally connected by a pin 164 passing through two aligned, elongate slots 165 in the overlapping portions of the link arms. The left shutter arm 152 is additionally provided with a driving arm 166 extending forwardly from the pivot point 156 and connected at its forward extremity by a swinging link 168 to an electrically operated shutter solenoid 170.

In operation, actuation of the solenoid causes the link 168 to move laterally to the right, thereby rotating the left shutter arm 152 about the pivot pin 156 from an initial closed position of the shutter, shown in FIGURE 6, to an open position, shown in FIGURE 8, in which the left edge of the shutter arm 152 lies along the left edge of the base 120. This movement of the shutter arm 152 causes the pin 138 connected to the shutter arm 152 to be moved to the left along the channel 144, thereby moving the left shutter plate to the left until the pin abuts the extreme left extremity of the channel 144 at which time the aperture 135 is aligned with the aperture 122. At the same time, the link arm 160 is rotated rearwardly so that the pin 164 rotates the link arm 162 about the pivot point 158 thereby rotating the right shutter arm 154 outwardly. Movement of the right shutter arm 154 moves the right shutter plate 134 to the right until the pin 138 abuts the right extremity of the channel 145, at which time the aperture 135 is aligned with the aperture 122 so that the shutter 54 is fully open.

The aligned slots 165 in the link arms 160 and 162 receiving the pin 164 and the slots in the link arms 152 and 154 receiving the shutter pins 138 are each elongated in the direction of relative motion so as to permit relative translational movement between the pins and the adjacent portions of the arms occurring during rotation.

UPPER BODY

Figure 4:
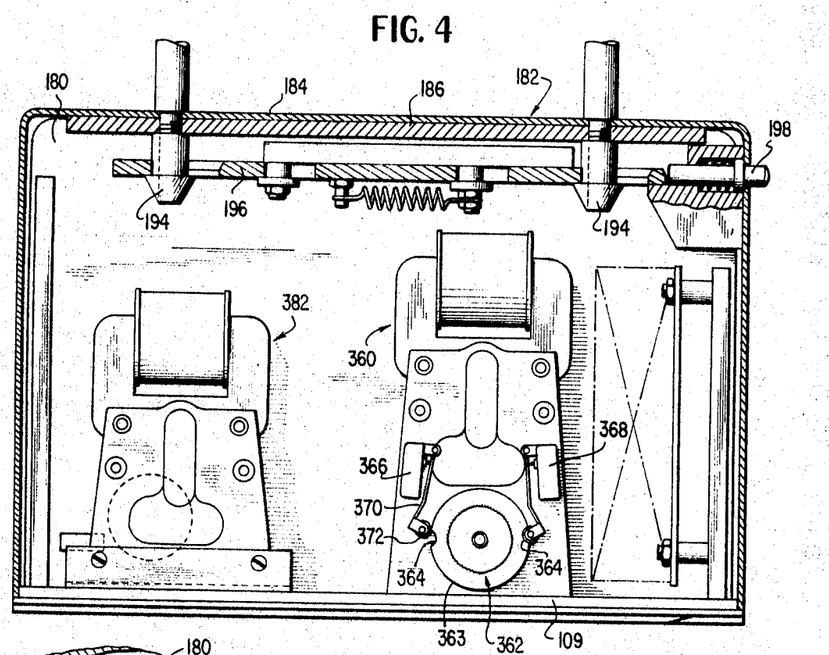
FIGURE 4 is a part-sectional side view of the upper body of the identification camera shown in perspective in FIGURE 1 from the right side, showing the advance motor cam.

The upper body 32, referring to FIGURES 3 and 4, includes the previously mentioned rectangular lower plate 108 coextensive with and slidable upon the upper plate 46 of the lower body and adapted to be secured thereto in the manner previously described. Secured to the upper surface of the plate 108 is the previously mentioned frame plate 109 and extending vertically upwardly therefrom is a rectangular, longitudinally extending support plate 180.

A vertically extending, hollow rectangular casing 182 may be removably positioned on the upper surface of the plate 108 with the periphery of the housing 182 extending about the periphery of the plate 108 to define a lighttight chamber enclosing the support plate 180. The casing 182 includes a flat, horizontal, rectangular upper surface 184 provided with a metal reinforcing plate 186 on its inner surface.

A carrying handle 189 (FIGURE 1) having a horizontal central portion 190 and two downwardly extending legs 192 is secured adjacent the lower extremities thereof to the reinforcing plate 186.

The lower extremities of the legs 192 project through the reinforcing plate 186 and are provided with enlarged latching portions 194 at their free extremities. The latching portions 194 may be engaged within correspondingly positioned apertures in a spring loaded, longitudinally sliding, locking plate 196 (FIGURE 4) connected to the support plate 180, to lock the housing 182 in position about the support plate 180 in lighttight engagement with the upper surface of the plate 108. The locking plate may be disengaged by pressing a spring loaded button 198 contacting the sliding locking plate 196, and projecting outwardly through an aperture in the forward end of the housing 182.

In order to support the unexposed film within the upper body, a supply spool 200 is supported on and parallel to the left side of the support plate 180 for rotation about a horizontal lateral axis. The supply spool 200 has a substantial capacity (in the preferred embodiment, a one hundred foot length of film capacity) to obviate the necessity for frequent reloading of the camera with film.

In order to provide a visual indication of the length of unexposed film remaining on the supply spool, a visual footage indicator 202 (FIGURES 2 and 10) is provided. The indicator comprises a rectangular, vertically extending housing 204 positioned on an interior surface of the left hand side of the housing 182. A cutout in the housing 182 overlying a part of the housing 204 is provided with a transparent window 205 through which may be seen a fixed, vertically extending graduated scale 206 forming an interior part of the casing 204 indicating film length. A vertically extending rod 208 passing vertically through the casing 204 for vertical sliding motion therein carries a pointer 210 movable vertically in front of the graduated scale 206 within the area of the transparent window 205. A horizontal, angled, top arm 212 secured to the upper extremity of the rod 208 supports at its free extremity a roller 214 contacting the periphery of the supply of film on the spool 200 at a vertically extreme portion thereof and adapted to move downwardly along a vertical diameter of the spool 200. A spring 216 connected at its upper extremity to the arm 212 and its lower extremity to the casing 204 biases the rod 208 downwardly.

Figure 10:
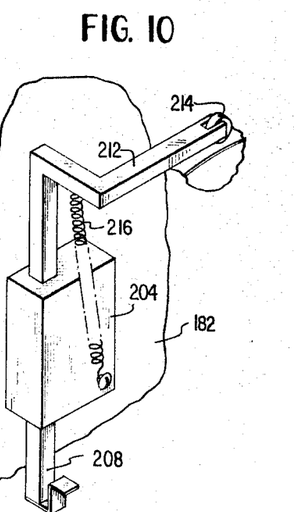
FIGURE 10 is a perspective view of a portion of the camera shown in FIGURE 1, showing the visual film length supply indicator.

In operation the position of the marker 210 on the film length scale 206 is controlled by the position of the rod 208 relative to the housing 204 as determined by the position of the roller 214 contacting the film on the spool 200.

Figures 11, 13, 14:
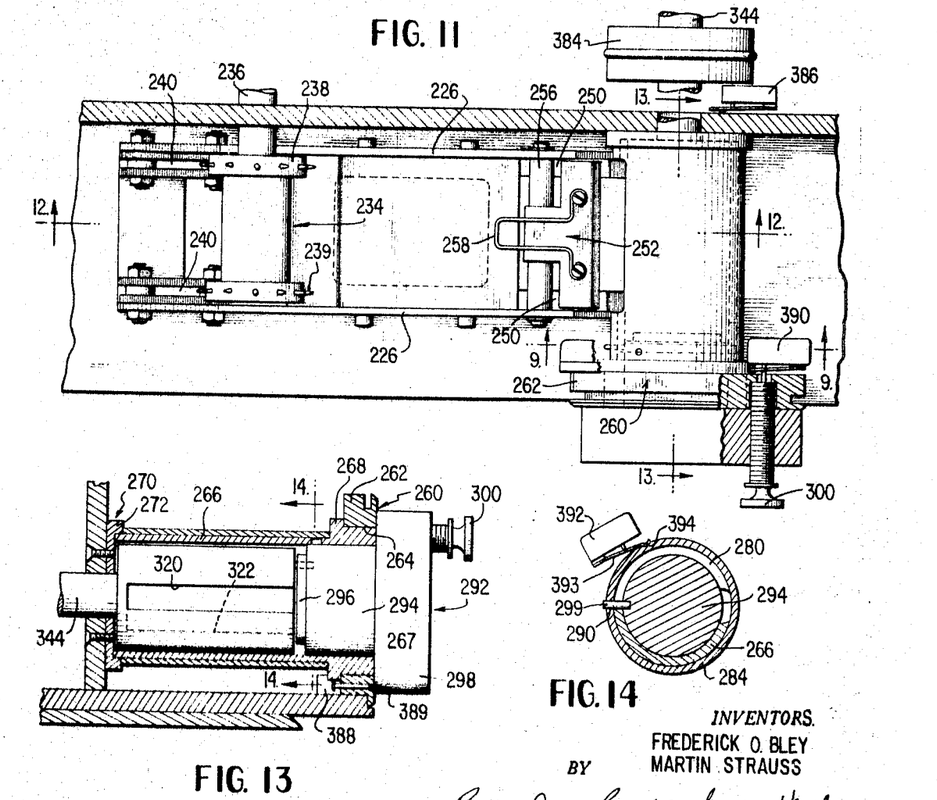
FIGURE 11 is a part-sectional top view of a portion of the camera shown in FIGURE 3 taken along the line 11—11 therein, showing the film path through the camera.
FIGURE 13 is a cross-sectional view of a portion of the camera shown in FIGURE 11 taken along the line 13—13 therein, showing the film cassette housed in the camera.
FIGURE 14 is a cross-sectional side view of the film, cassette housing shown in FIGURE 13 taken along the line 14—14 therein, to show the operation of the advance interlock switch.
Figure 12:
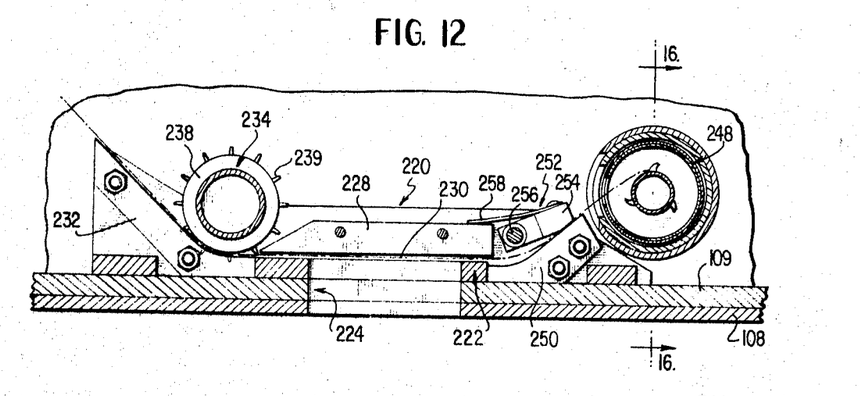
FIGURE 12 is a sectional view of a portion of the camera shown in FIGURE 11 taken along the line 12—12 therein, showing a side view of the path of the film through the camera.

Film is directed from the supply spool 200 through a film guide 220 (FIGURES 11 and 12). On initial loading of the spool into the camera, threading of the film through the guide 220 is performed manually.

The film guide 220 includes a generally rectangular, longitudinally extending base plate 222 secured to the upper surface of the frame plate 109. An aperture 224 coextensive and aligned with the aperture 52 in the base plate 46 of the lower body when the upper and lower bodies 32 and 28 are engaged extends through the base plate 222, the frame plate 109 and the base 108.

To guide the film longitudinally on the base plate 222, two opposed, longitudinally and vertically extending guide plates 226 are secured along the lateral extremities of the base plate 222. A top guide plate 228 is secured to and between the guide plates 226 and has a lower surface spaced closely above and parallel to the base plate 222 defining in conjunction with the upper surface of the plate 222 a horizontal guide channel 230 for guiding the film in a flat condition past the aperture 224. Operation of the shutter 54 permits the lens 50 to produce a focused image on that portion of the film positioned within the area of the aperture 224 to produce an exposure thereon of longitudinal extent equal to that of the aperture 224.

The film is guided into the channel 230 by two laterally opposed, forwardly and downwardly inclined ramps 232 secured to a rear portion of the base plate 222 between and adjacent the guides 226.

In order to advance the film, a rotatable, horizontally disposed laterally extending film advance sprocket 234 is mounted adjacent and longitudinally intermediate the film support ramps 232 and the top guide plate 228. The film advance sprocket 234 comprises a laterally extending driving shaft 236 having concentrically mounted thereon two laterally opposed hubs 238 of relatively greater diameter than the shaft 236, aligned with the film support ramps 232. The lowest peripheral portion of each of the hubs 238 is on a horizontal level with the guide channel 230. Each of the hubs 238 is provided with a plurality of peripherally spaced, radially projecting driving teeth 239 adapted to drivingly engage the usual sprocket holes provided along the lateral edges of the film, the teeth 239 being received during a portion of their travel within vertically extending slots 240 in the ramps 232.

As the film is advanced between successive exposures, a longitudinally extending, spacing portion of unexposed film is provided between successively adjacent exposed areas of film. The longitudinal extent of each exposure added to the longitudinal spacing portion between that exposure and the next succeeding exposure defines one frame length of the film. One half revolution of the shaft 236 advances the film by one frame length.

Film leaving the guide channel 230 is directed forwardly and upwardly into a removable film cassette 248 having a smaller film capacity than the spool 200, to be described hereinafter, by two laterally opposed exit ramps 250 extending upwardly and forwardly from the forward end of the base plate 222 intermediate and adjacent the guides 226. To hold the film against the exit ramps 250, a spring loaded wiper 252 is provided. The wiper 252 comprises a laterally extending blade 254 rotatably mounted on a laterally extending shaft 256 supported on the opposed guides 226, for pivotal motion in the vertical plane. A flat spring 258 connected to the upper surface of the support 252 abuttingly contacts an upper surface of the top guide 228 to bias the wiper bar 254 against the exit ramps 250 to hold the film in contact with the exit ramps. In this manner, the film leaves the film guide 220 at a uniform angle thus ensuring entry of the film into the cassette at a uniform angle.

CASSETTE HOUSING AND CASSETTE

Figures 15, 16:
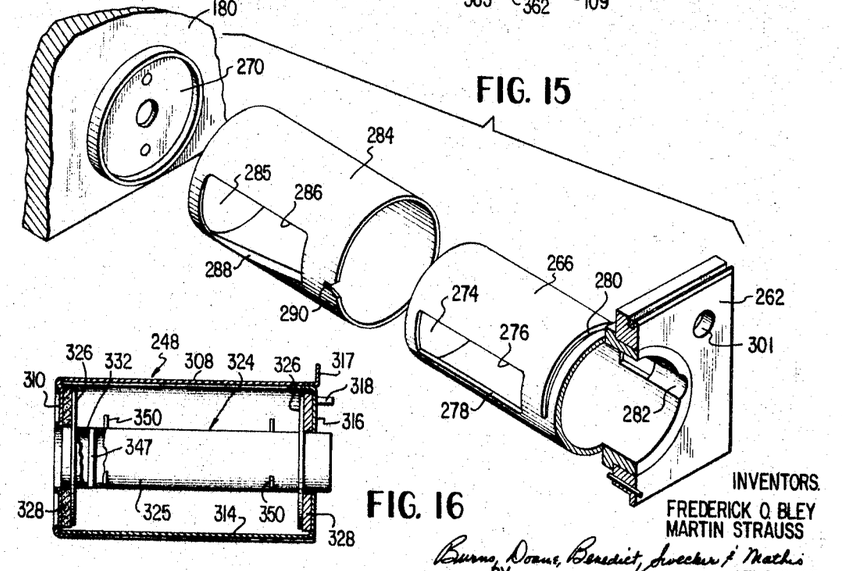
FIGURE 15 is a part-sectional, exploded, perspective view of the cassette housing of FIGURE 13, showing the severing sleeve.
FIGURE 16 is a part-sectional view of the film cassette shown in FIGURE 12 along the line 16—16 therein, showing the film spool.

Also housed in the upper body 32 of the camera is the previously mentioned cassette 248 and a cassette housing, generally denoted as 260, shown in FIGURES 11, 13 and 15. The cassette housing 260 includes a rectangular, vertically and longitudinally extending, support plate 262 secured to the left forward edge of the upper surface of the frame plate 109 of the upper body. An aperture 264 within the support plate 262 receives one extremity of a horizontal, transversely extending, inner housing 266.

The inner housing 266, of uniform internal diameter and of uniform external diameter through the major lateral portion of its length, is provided with a concentric hub 267 of relatively enlarged diameter extending from the left extremity of the housing through the support plate 262 and a concentric annular collar 268 projecting radially from the hub 267 adjacent and abutting the right surface of the support plate 262.

The right extremity of the inner housing 266 is supported by a disc 270 secured to the left face of the central support plate 180 and provided with a laterally projecting, annular flange 272 extending about and abuttingly supporting a portion of the outer peripheral surface of the free extremity of the inner housing 266. The cassette 248 is received within the inner housing 266 with one extremity of the cassette abutting the disc 270.

In order to permit film to pass through the inner housing 266 into the cassette, a rectangular slot 274 (FIGURE 15) having equal length, vertically spaced, horizontally disposed, upper and lower edges 276 and 278 extends transversely across that portion of the inner housing 266 located adjacent to the peripheral surface of cassette 248. The inner housing 266 also includes an annular slot 280 extending arcuately about the inner housing from a point substantially in angular alignment with the edge 278 of the slot 274 forwardly for substantially 180°. The slot 280 is axially positioned adjacent the collar 268, and spaced a short rightward distance therefrom. Extending from the forward end of the slot 280 to the right extremity of the inner housing 266 is an axially extending, radially depressed groove 282 to be described in more detail hereinafter.

A sleeve 284 is snugly and rotatably positioned about a portion of the exterior of the inner housing 266 of uniform external diameter. The sleeve 284 has its opposed transverse extremities slidably abutting the flange 270 and the collar 268. The sleeve 264 is provided with a quadrilateral aperture 285 defined by vertically spaced, transversely extending upper and lower edges 286 and 288, respectively. The upper edge 286 of the sleeve 284 may be rotated into alignment with the upper edge 276 of the slot in the housing 266 in which position the left extremity of the lower edge 288 is positioned vertically below and closely adjacent the left extremity of the lower edge 278 of the slot in the housing 266. The edge 288 is provided with a sharpened cutting blade and is inclined downwardly and rightwardly from the left extremity thereof to a point in vertical alignment below the right extremities of the upper edge 286.

A hole 290 in the sleeve 284 adjacent the left extremity thereof is aligned with the rearward extremity of the slot 280 in the inner housing 266 when the edges 286 and 276 of the slots in the sleeve and spool respectively are aligned. An axially extending, V-shaped notch extends laterally from the left extremity of the sleeve 284 to intersect the hole 290.

In order to retain the cassette 248 in a housed position within the casing 266, a cover 292 (FIGURE 13) is provided. The cover 292 includes a central, cylindrical center body 294 slidably and snugly received within the open left extremity of the casing 266. A circular step 296 concentric with the central body and of relatively reduced diameter projects from the right extremity thereof and is provided with a flat surface abutting the adjacent end of the cassette 248.

A cylindrical boss 298 is positioned on and concentric with the left extremity of the central body 294 and is of relatively greater diameter. The right face of the boss 298 abuts the vertically aligned, left end surfaces of the inner housing 266 and the support plate 262.

In order to rotate the sleeve 284 about the casing 266, a projection 299 is provided on the exterior of the central body 294 in a position to project radially through the annular slot 280 in the casing 266 for free angular movement therein and the hole 290 in the sleeve 284. The previously mentioned groove 282, in that portion of its length in which it passes through the hub 267 and the collar 268, is of sufficient radial extent to permit the cover 292 to be moved freely into and from the housing 266 when the projection 299 is aligned with the groove 282. The cover may be rotated within the casing 266 between a terminal position in which the projection 299 abuts the rear extremity of the slot 280 and an entry position in which the projection 299 abuts the forward extremity of the slot 280. From the entry position, the cover 292 may be withdrawn from the projection 299 passing unobstructedly outwardly along the groove 282.

Rotation of the cover 292 from the terminal to the entry positions rotates the blade 288 from an open position below the lower edge 278 of the housing 266 to a closed position above the upper edge 276, thereby severing film passing through the aperture 274 into the inner housing 266 and at the same time closing over the aperture 274.

It will be seen that the arrangement described advantageously utilizes the projection 299 to both engage the cover 292 with the inner spool 266 and also to rotate the sleeve 284 to open and close the aperture 274 and cut the film.

In order to provide additional security, a laterally movable locking screw 300 is provided on the boss 298 and is threadedly engageable with a threaded aperture 301 provided in the support plate 262 to prevent rotation of the cover 292 from the terminal position thereof. The locking screw 300 thus prevents inadvertent rotation and release of the cover by the operator during use of the camera.

The cassette 248 (FIGURE 16) includes a cylindrical housing 308 adapted to be nugly and slidably received within the housing 266 provided with an annular end plate 310 at its right extremity. Slidably and rotatably received within the outer housing 308 is a concentric, snugly fitting inner housing 314. Means (not shown and not forming a part of the present invention) may be provided for selectively preventing removal of the inner housing 314 from the outer housing 308. The inner housing 314 is provided with an annular end plate 316 at its right extremity. A radially extending projection 317 at the left extremity of the outer housing 308 is received within the groove 282 in the housing 266 to prevent rotation of the housing 308 within the housing 266. A boss 318 projects outwardly from the end plate 316 of the inner housing and is received within an axially extending, eccentrically located hole 319 provided in the adjacent end face of the cover 292. Thus, rotation of the cover 292 within the inner housing 266 causes relative rotation between the inner housing 314 connected to the cover by the pin 318, and the outer housing 308 secured to the housing 266 by the projection 317.

The outer and inner housings 308 and 314 are provided with transversely extending, generally vertically coextensive apertures 320 and 322 respectively on their rear surfaces. With the cover 292 in the terminal position, the apertures 320 and 322 in the cassette 248 are aligned to permit film to enter the cassette. As the cover 292 is rotated to the entry position prior to removal of the cassette, the previously mentioned connection afforded by pin 318 between the inner housing 314 and the cover 392 causes the apertures 320 and 322 to be rotated entirely out of coincidence with the result that a lighttight enclosure is provided.

The angular relation between the position of the pin 299 on the central portion 294 of the cover and the hole 319 therein is such that the cutting blade of the outer sleeve 284 severs the film in advance of complete closure of the cassette 248 about the film.

In order to support the film received within the cassette 248, a spool 324 is provided. The spool includes an axial shaft 325 supported at its opposed lateral extremities by aligned apertures within the end plates 310 and 316 of the outer and inner housings, respectively, for rotation. Adjacent the internal surface of each of the end plates 310 and 316 is positioned an annular flange plate 326 secured to the shaft 325. An annular band 328 of compressible, light sealing material, such as felt, is secured to each of the end plates 310 and 316 abutting the adjacent flange plates 326 to provide a lighttight seal between the interior of the spool 324 and the cassette 248.

The right extremity 330 of the shaft 325 is provided with an axial recess 332 receiving a spring loaded, transversely extending, takeup drive shaft 344 rotatably mounted on the vertical support plate 180. The shaft 344 is provided with a slot on its forward radial surface for engaging a pin 347 secured to the shaft 325 extending diametrically across the axial recess 332 therein. As will be described hereinafter, the takeup drive shaft 344 is rotated to turn the shaft 325 within the cassette 248. The spool shaft 325 is provided with two axially spaced, peripherally extending rows of forwardly facing, hooked projections 350. The lateral positioning of the projections 350 is such as to align them with the sprocket holes provided in the opposed lateral edges of the film. As the free end of the film advances into the cassette with the take-up shaft 344 rotating the spool shaft 325, those of the projections 350 peripherally adjacent the film will engage the immediately adjacent sprocket holes so that film is wound automatically onto the spool and supported thereby without any need for manual threading.

It will be seen that the cassette and cassette housing arrangement described offers numerous advantages. During loading, the free end of the film may be engaged automatically by the projections 350 to eliminate the need for manually threading film into the cassette by the operator. Similarly, during unloading the film is automatically severed and the cassette and camera sealed from the intrusion of light at the same time as the cover is rotated to free the cassette for removal.

FILM DRIVE MECHANISM

Figure 17:
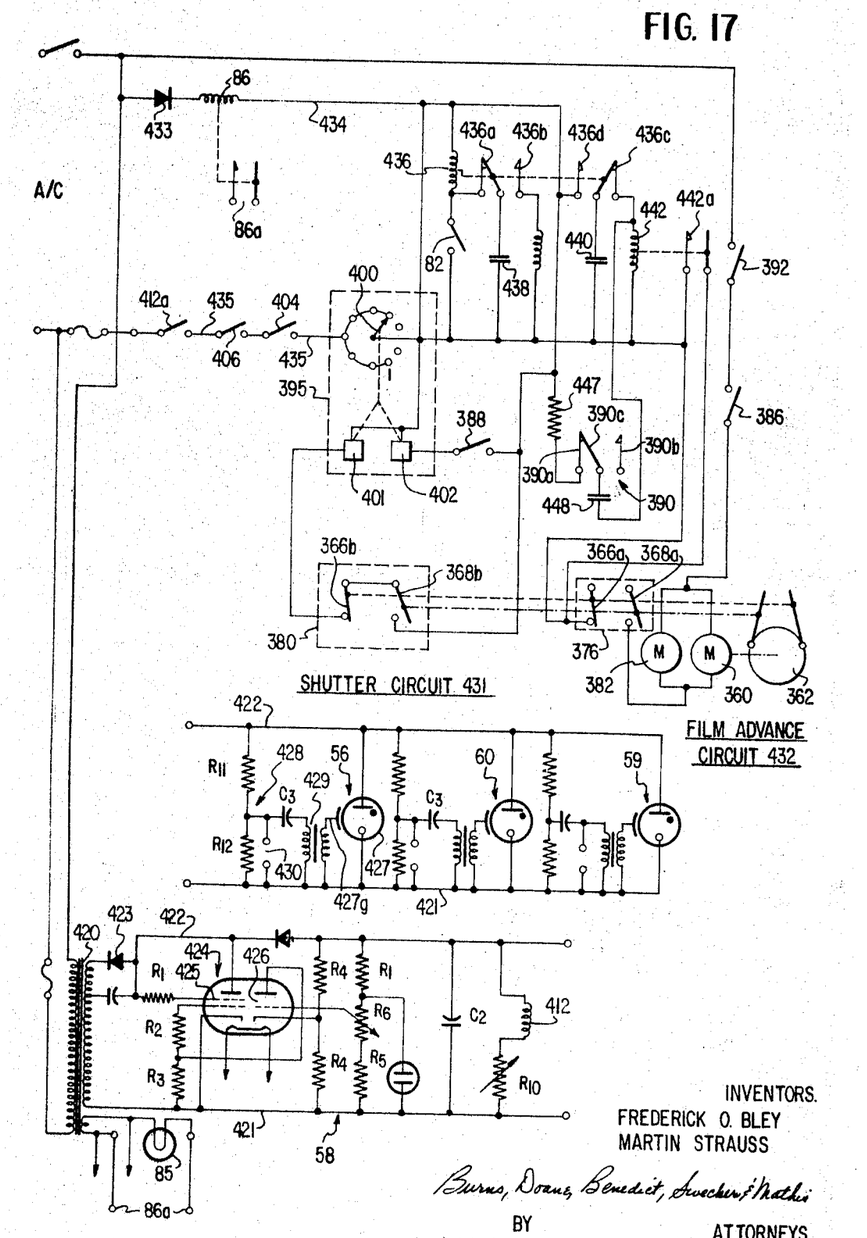
FIGURE 17 is a schematic diagram showing the electrical control circuits of the camera according to the present invention.

Referring to FIGURES 4 and 17, the film advance system may be seen to include an advance motor 360 supported on the frame plate 109 and the support plate 180, drivingly connected to the previously mentioned film advance shaft 236. An advance cam 362 is fixedly secured to the right extremity of the shaft 236 and rotates therewith. The periphery of the cam 362 includes an outer circular portion 363 of uniform radius and two relatively recessed notches 364 angularly spaced on the periphery at slightly less than one-half a revolution. Secured to the housing of the motor 360 above and on either side of the cam 362 are forward and rear control microswitches 366 and 368, respectively. Each of the microswitches supports a depending, rotatable arm 370 provided with a roller 372 at its free extremity. The rollers 372 are on a horizontal level passing through the center of rotation of the cam 362 and are biased against the periphery thereof. Each microswitch is moved from an ON to an OFF condition when its depending arm 370 is moved relatively away from the microswitch by radial movement of the roller 372 at the extremity of the arm 370 into one of the notches 364. Each microswitch 366 and 368 closes two independent sets of contacts when placed in the ON condition.

One set of contacts 366a of the forward microswitch 366 is connected in series with one set of contacts 368a of the rear microswitch 368 to constitute an advance control switch 376.

The other set of contacts 366b of the forward microswitch 366 are connected in series with the other set of contacts 368b of the rear microswitch 368 to constitute a stepping switch pulse switch 380.

The advance motor 360, as will be described, is connected in series with the advance control switch 376 and an external source of power so that the motor may only be operated when both sets of contacts 366a and 368a are closed. In a condition of repose, one of the rollers 372 will be resting in one of the notches 364 in the cam 362 so that one of the microswitches 366, 368 is in an OFF condition, thus disconnecting the advance motor 360 from power. Operation of the shutter, in a manner to be discussed, gives a momentary pulse to the advance motor 360 commencing rotation of the cam 362. Momentary rotation of the motor causes the one of the two rollers 372 that was resting in a notch 364, to move outwardly onto the circular portion 363 of the periphery of the cam 362, placing the one of the microswitches 366 and 368, previously OFF, in an ON condition, with the result that both sets of contacts 366a and 368a constituting the advance motor switch 376 are closed so that power continues to be applied to the motor even after the initial pulse has terminated. After the cam has rotated one-half revolution, the other roller 372 will drop into the other slot 364 placing the one of the microswitches 366 and 368 with which it is connected OFF and discontinuing operation of the motor. In this manner, a uniform angular amount of advance motor rotation, and hence of film advance, is effected upon each operation of the motor.

Similarly, the stepping pulse switch 380 is atcuated concurrently with each operation of the advance control switch 376 in order to give a single pulse on each advance of the film, for reasons to be discussed.

In order to insure that film is wound positively into the cassette 248, a take-up motor 382 secured to the frame plate 109 and to the right side of the support plate 180 is drivingly connected with the previously mentioned take-up advance shaft 344 contacting the cassette spool 324. The take-up motor 382 is connected in parallel with the advance motor 360 and operates concurrently therewith. In order to provide for secure engagement of the free end of the film with the projections 350, the take-up motor 382 has a higher free running speed than the advance motor 360 with the result that as the free end of the film enters the cassette 248 and approaches the spool, the projections 350 and the spool shaft 325 are moving at a faster peripheral speed than the linear speed of the advancing film. In this manner, the projections 350 are offered an increased number of opportunities to engage the sprocket holes in the free end of the film during its period of advance than would be the case if the take-up motor and the advance motor were synchronized. In order to insure that the film is not overloaded, a torque clutch 384 of any suitable, commercially available type is interposed between the take-up motor 382 and the drive shaft 344 thus limiting the force exerted on the film by the projections 350 secured to the spool 324.

CAMERA CONTROL SWITCHING ELEMENTS

To prevent operation of the camera when no cassette is present, a cassette sensor switch 386 (FIGURE 11) is supported on the right face of the vertical support plate 180 and is provided with a sensing finger projecting into the interior of the inner housing 266. The cassette sensor switch is normally biased to an OFF position and is placed in an ON position by the presence of a cassette within the housing 266 contacting the finger. The cassette sensor switch in the OFF condition prevents operation of the advance motor 360 in a manner to be described so as to prevent film being advanced at any time when no cassette is present to receive the film.

In a similar manner, the presence of the cover 292 in the housing 266 is sensed by a reset microswitch 388 (FIGURE 13), the contacts of which are opened by a finger 389 contacting the boss 298 of the cover in the secured position thereof, for a purpose to be described.

In order to relate cassette removal and insertion to film advance, an automatic film advance switch 390 (FIGURE 11) connected to the right face of the support plate 262 is provided. The automatic film advance switch 390, spring biased to an OFF condition, is contacted by the right extremity of the previously mentioned locking screw 300 as it reaches the fully locked position. Actuation of the automatic film advance switch 390 automatically causes film to be advanced on both release and connection of the locking screw 300 with the plate 262.

The thread on the screw 300 is made sufficiently fine to insure that the operator will not be able to fully unscrew the locking screw in less time than it takes for the film advance.

An advance interlock switch 392 (FIGURE 14) is also provided, having a depending sensing arm 393 contacting the outer surface of the outer sleeve 284. During operation of the camera with the cover 292 in the terminal position thereof and the outer sleeve 284 in the fully open position, the free extremity of the sensing arm 393 rests in a depression 394 provided in the surface of the outer sleeve 284, in which condition the contacts of the switch are closed. However, rotation of the cover 292 and hence of the sleeve 284 causes the free end of the sensing arm 393 to ride radially outwardly from the depression 394, opening the contacts of the switch 392.

In order to count the number of frames exposed and automatically cut off operation of the camera after a predetermined number of frames, not exceeding the maximum film length capacity of the cassette 248, have been exposed, a stepping switch 395 supported on the left side of the support plate 180, see FIGURE 3, is provided. Although any suitable commercially available stepping switch may be employed, one particular model employed in the preferred embodiment of the present invention is the rotary stepping switch, Model No. RT–404, manufactured by the Schrack Company of Vienna, Austria. As utilized in the present invention, the stepping switch 395 includes a central connection to a rotatable wiper 400 which may be rotated sequentially through a series of forty discrete positions to place the wiper in separate electrical connection with each of forty angularly spaced, radially positioned connectors. The stepping switch includes a stepping switch, single step unit 401 which advances the wiper 400 one position on each application of power and a stepping switch reset unit 402 which advances the wiper to the fortieth position of the switch from any prior position on each application of power to the reset unit 402.

Prevention of exposure when the supply of film in the camera has become exhausted is effected by a film supply microswitch 404 (FIGURE 3) positioned on the frame support plate 109 intermediate the film support guides 226 and forwardly adjacent the drive sprocket 234. The film supply microswitch 404 is biased to an OFF condition and includes a sensing arm contacting the supply of film and depressed thereby to close the contacts of the film supply switch in the presence of film to permit operation of the camera only when there is at least one frame length of unexposed film in advance of the exposure aperture 224.

An identification card sensing microswitch 406 for sensing the presence of one of the previously mentioned cards 61 bearing indicia identifying the subject matter of the exposure to be made on a particular area of the card, is provided (FIGURE 3). The identification card sensing microswitch 406, secured to a portion of the frame 44 of the lower body 28 and normally biased to an OFF condition, may be contacted by an identification card 61 and thereby placed in the ON condition only when a card is fully inserted within the slot 63 with the identifyng indicia on the card positioned over the aperture 65. The identification card microswitch 406 in a manner to be described prevents operation of the camera when the switch is in the OFF condition.

In order to ensure that the card 61 may not be inserted upside-down or wrong end first, the cards 61 are asymmetrical having one corner trimmed off. A vertically extending orientation stop 408 (FIGURE 6) is provided in one corner of the slot 63 so that one of the remaining uncut corners of any incorrectly oriented card will contact the stop 408, thus preventing further insertion of the card before it can contact the identification card microswitch 406, which will not, therefore, be placed in the ON condition to permit operation of the camera.

To insure that every exposure of the film is made under uniform lighting conditions, as is essential for successful automatic processing of color film, a flash sensor relay 412 is provided. The flash sensor relay 412 controls the closure of a set of normally open contacts 412a when the power pack 58 has attained a charge level sufficient to ensure a uniform and adequate amount of illumination to be provided by the flash units.

FLASH ILLUMINATION APPARATUS

A diagrammatic representation of the power pack 58 for the electronic flash units and of the trigger circuits for the flash units is included in FIGURE 17.

The power pack 58 includes a transfarmer 420 having its primary windings connected to the source of A.C. supply and its secondary windings at the opposed extremities thereof, connected to a base line 421 and an anode line 422 respectively. A rectifier 423 is connected in series in the anode line 422 in such a sense as to cause the anode line 422 to be at a positive D.C. potential with respect to the base line 421. Connected between the anode and base lines 422 and 421 is a charging capacitor C2 utilized to store the electrical charge subsequently to be discharged across the flash units. Connected in parallel with the capacitor C2 is a thermionic valve 424 having pentode and triode sections 425 and 426 respectively.

The pentode section 425 includes an anode connected to the anode line 422 and a cathode connected to the base line 421. The pentode section 425 further includes a screen grid connected to the anode line 422 through a resistor R1 to provide screen bias. A control grid of the pentode section 425 is connected to the base line 421 through resistors R2 and R3 connected in series. The total resistance value of R2 and R3 is sufficient to cause the central grid of the pentode section 425 to be biased sufficiently negative with respect to the cathode thereof to prevent current flow through the pentode section 425.

The triode section 426 includes an anode connected to the control grid of the pentode section 425 at the junction of the resistors R2 and R3. Current flow through the triode section 426 and hence through the resistor R3 develops a positive potential across the resistor R3 thus reducing the negative bias on the control grid of the pentode section 425 to a level at which the pentode section 425 commences to conduct current.

The cathode of the triode section 426 is biased to a negative potential with respect to the anode of the triode section 426 by connection to a potential divider, comprising resistors R4 and R5, connected in series between the anode and base lines 422 and 421. The control grid of the triode section 426 is connected to a variable resistor R6 connected in series with resistors R7 and R8 between the anode and base lines, in parallel with the charging capacitor C2.

The potential on the grid of the triode section 426 is thus responsive to the charge level attained by the capacitor C2. By suitable adjustment of the variable resistor R6 the potential of the control grid of the triode section 426 may be rendered sufficiently negative with respect to the cathode at some predetermined charge potential of the capacitor C2 to render the triode section 426 of the valve non-conductive. As flow through the triode section ceases, current ceases to flow from the anode of the triode section 426 through the resistor R3 with the result that the control grid of the pentode section 425 becomes biased sufficiently negative to cut off flow of current through the pentode section 425.

Connected in series in the anode line 422 intermediate the points of connection thereof to the pentode section of the valve 424 and the capacitor C2 is a second rectifier 427 permitting current flow from one side of the capacitor C2 through the pentode section 425 of the valve to the other side of the capacitor, and blocking current flow in the reverse sense.

In operation, when the charge level of the capacitor C2 is below the predetermined level, the potential applied to the capacitor C2 by the anode and base lines will cause charge to flow from one side of the capacitor through the pentode section 425 of the valve 424 (acting as a rectifier), and through the rectifier 427 to the other side of the capacitor so that it becomes charged. As the capacitor C2 attains the predetermined charge level, the potential of the control grid of the triode section 426, connected to the voltage divider R6 connected in parallel across the capacitor C2, rises to a sufficient value to cut off current flow through the triode section 426 which in turn causes flow of current through the pentode section 425 to cease. As the pentode section 426 ceases to conduct, further charging of the capacitor C2 will cease while at the same time leakage of the charge from the capacitor C2 in the reverse direction is prevented by the rectifier 427.

In this manner it will be seen that a power pack particularly adapted to charge the capacitor C2 to a uniform level of charge is provided so that each exposure made in each case occurs under uniform lighting conditions.

Connected across the capacitor C2 in parallel therewith is a variable resistor R10 connected in series with the sensor relay 412. The values of the resistor R10 and the resistance of the relay 412 are such that the current flow through the relay 412 is below the limiting current value necessary for operation of the relay 412 when the potential across the capacitor C2 is less than that necessary to ensure adequate illumination. Only when the capacitor has charged to the desired level, will the current through the relay 412 be sufficient for it to operate. In a manner to be described, the shutter may not be operated when the relay 412 is not actuated, with the advantageous result that exposures of film may not be made when the power pack is insufficiently charged to ensure adequate flash illumination.

The previously mentioned annular flash unit 56, external flash unit 59, and card flash unit 60 are connected in parallel across the capacitor C2. Each flash unit includes a gas filled discharge tube 427 having an anode connected to the anode line 422 and a cathode connected to the base line 421, across which the capacitor C2 may be discharged when an external potential is applied to a trigger grid 427g of the tube to ionize the gas by means of a trigger circuit 428. Each trigger circuit 428 includes a voltage divider including two resistors in series R11, R12 connected in parallel with the discharge tube 427. A capacitor C3 connected to the voltage divider at the junction of the resistors C1, C2 is connected to one end of a primary winding of a transformer 429. The other side of the primary winding of the transformer 429 is connected to the base line 421. The secondary coil of the transformer 429 is connected on one side between the cathode and the trigger grid 427g of the gas discharge valve. A set of normally open contacts 430 connected between the base line 421 and the junction of the capacitor C3 with the voltage divider are closed concurrently with operation of the shutter solenoid 170 to discharge the capacitor C3. This gives a pulse through the primary coil of the transformer 429 which is multiplied in the secondary windings of the transformer to a potential sufficient to cause the trigger grid 427g to ionize the gas in the discharge valve 427 so that the capacitor C2 may discharge across the valve 427 to provide a flash of illumination.

CAMERA CONTROL CIRCUITS

Referring to FIGURE 17, the operation of the camera may be seen to be controlled by a shutter circuit 431 controlling the operation of the shutter 54 and a film advance circuit 432 controlling the movement of film through the camera. Power for operation of the camera is supplied from any convenient external, electrical A.C. source through a suitable cable connected to the camera.

The shutter circuit 431 utilizes a rectifier 433 connected in series with one connection with the source of A.C. power, to provide a D.C. supply distributed through a positive line 434 and a base line 435. Connected in series and in sequence across the D.C. supply are the set 412a of contacts controlled by the flash sensor relay 412, the identification card sensing switch 406, the film supply switch 404, the stepping switch 395 and the ready light relay 86. The stepping switch 395 provides continuous electrical connection through the switch in each of its positions with the exception of positions thirty-seven to forty, inclusive. When each of the above-mentioned switches and the set of contacts 412a of the flash sensor relay are closed, the ready light relay 86 operates to close a set of contacts 86a applying power to illuminate the ready light 85, thus indicating to the operator that the camera is ready to take a photograph.

Also connected across the D.C. supply are a trigger release relay 436 and the previously mentioned trigger switch 82. In a resting condition of the trigger release relay 436, a capacitor 438 connected to the base line 435 is connected through one set of contacts 436a to the positive line 434 and charged. Operation of the trigger release relay 436 connects the capacitor 438 through another set of contacts 436b and the shutter solenoid 170 to the base line 433 to discharge the capacitor 438. Another capacitor 440, connected to the base line 435, is connected through another set of contacts 436c controlled by the trigger release relay 436 to one side of a transport pulse relay 442 in the resting condition of the relay. The other side of the transport pulse relay 442 is connected to the base line 435. Operation of the trigger release relay disconnects the capacitor 440 from the transport pulse relay and connects the capacitor through a set of contacts 436d to the positive line 434 to charge the capacitor.

In operation, closing of the trigger release switch 82 operates the trigger release relay 436 which closes contacts 436b to cause the capacitor 438 to discharge through the shutter solenoid 170 to actuate the shutter 54. At the same time the capacitor 440 is connected to the positive line 434 through the contacts 436d and charged. As the operator releases the trigger 82 and the trigger release relay is inactivated, the capacitor 440 is then discharged across the transport pulse relay 443 which is connected at its other end to the base line 435, through the contacts 436c to operate the transport pulse relay 442.

Also connected in series across the D.C. supply are the aiming light 70 and the foot switch 26.

The shutter circuit also includes the previously mentioned automatic film advance switch 390. The switch 390 includes fixed contacts 390a and 390b and a movable central connector 390c. The contact 390a is connected with the positive side of the D.C. supply through a resistor 447. The contact 390c is connected in series with a capacitor 448 and the transport pulse relay 442 to the negative line 435. During loading of the cassette 248 into the camera, the locking screw 300, as previously described, is screwed in, thereby moving connector 390c into contact with the fixed connector 390a so that the capacitor 448 commences charging. During charging of the capacitor 448, the transport pulse relay 442 is operated to cause the motor 360 to rotate, as described hereinafter. The capacitor 448 and the resistor 447 have a time delay on charging sufficient to ensure that current flows through the transport pulse relay 442 for a sufficient period to permit the motor 360 to advance the film one frame length.

Prior to releasing the cassette 248, the locking screw 300 is unthreaded causing the connector 390c to contact the connector 390b, thereby permitting the capacitor 448 to discharge through the transport pulse relay 442. Due to the different time characteristics of the capacitor 448 on charge and discharge, the time for which discharge of the capacitor 448 provides an adequate current through the relay 442 for its operation is longer than on charging and is sufficient to permit the motor 360 to advance the film two frame lengths. Thus, the last exposed frame and a suitable one-frame length of unexposed film are advanced into the cassette automatically.

To advance the wiper 400 of the stepping switch 345, the previously mentioned stepping switch single step unit 407 is connected across the D.C. supply in series with the stepping switch pulse switch 380 which, as described previously, is operated once on each half-revolution of the cam 362.

Also connected in series across the D.C. supply are the stepping switch reset unit 402 and the stepping switch reset switch 388, the contacts of which latter are closed only when the cover 292 is removed from the housing 266. Operation of the stepping switch reset unit 402 causes the stepping switch wiper 400 to be reset to the fortieth position of the wiper position from any prior position.

The film advance circuit 432 includes the previously mentioned take-up and advance motors 382 and 360, respectively connected in parallel with each other. Connected in series with the motors across the A.C. supply are the advance control switch 376, the take-up cassette sensor switch 386 and the advance interlock switch 392.

OPERATION OF THE CAMERA

The operator wheels the bassinet 18 beneath the camera 2. The operator places her foot upon the aiming light switch 26 to complete an electrical circuit through the aiming light 70 to direct a beam of light therefrom vertically downward. By employing a foot switch, the operator is left free to use both hands to maneuver the bassinet 18 so as to align some specific portion of the baby, such as, for example, the bridge of his nose, beneath the beam of light projecting from the aiming light 70. Use of the aiming light ensures that each baby is identically located relative to the camera lens 50 so that the image of each baby photographed occurs at the same location on each exposed frame of film, this being an essential requirement if automatic processing of the film, including automatic printing, is to be employed successfully. After the baby has been aligned, the operator inserts one of the identifying cards 61 into the slot 63 on the lower body of the camera. The previously mentioned orientation stop 408 in one corner of the slot 63 ensures that the card 61 can only be fully inserted in one particular orientation of the card. The baby's name is positioned on the card in such position that it overlies the slot 65 in the card support plate 62 when the card is properly inserted into the camera, at which time the identification card sensing switch 406 will be contacted by the card so that the switch contacts are closed.

The presence of an adequate supply of film in the camera, sensed by the film supply switch 404, closes the contacts of this switch.

Assuming that charge level of the power pack 58 for the electronic units has attained the predetermined charge level necessary to ensure adequate subject illumination, the flash sensor relay 412 is operated to close the contacts 412a.

In this condition, a circuit will be completed through the flash sensor relay contacts 412a, the identification card sensing switch 406, the film sensor switch 404, the stepping switch 395, and the ready light relay 86 which latter operates to close contacts 86a supplying power to the ready light 85 to illuminate the trigger rod 74. This will thereby give the operator a visual indication that the cemera is ready for use.

By pressing either free end of the trigger rod 74, the trigger switch 82 is closed to complete a circuit actuating the trigger release relay 436 which closes the contacts 436a, thereby discharging the capacitor 438 through the shutter solenoid 170 to actuate the shutter and expose the film. At the same time, the flash contacts 430 are also closed, thus permitting the capacitors C3 to discharge thereby causing the trigger electrodes 427g to ionize the gas in the discharge 427 valves of each of the various flash units so that the capacitor C2 may discharge therethrough to provide flash illumination.

Also, at the same time, the contacts 436 supply power to the capacitor 440 which charges from the D.C. supply. After discharge of the capacitor C2, the flash sensor relay 412 becomes inoperative causing the relay contacts 412a to open thus rendering the relay 436 inoperative and permitting the contacts 436c to close. Closing of the contacts 436c causes the capacitor 440 to discharge through the transport pulse relay 442, which closes the relay contacts 442a. It will be seen that by the arrangement described movement of the film may not be effectuated until the shutter 54 has closed thus preventing any possible blurring of the pictures.

Closure of the contacts 442a completes a electrical power circuit through the advance and take-up motors 360 and 382, respectively, and the source of A.C. supply so that the motors commence to rotate. Commencement of rotation of the advance motor 360 causes the cam 362 to rotate so that whichever one of the rollers 372 was previously received in a notch 364, is moved radially outwardly on the cam 362. As previously discussed, in a condition in which both the rollers 372 are riding on the outer circular periphery of the cam, both of the control microswitches 366 and 368 are in a closed condition, thus maintaining power connection to the advance motor 360 and the take-up motor 382 even when subsequent opening of the relay contacts 442a occurs after the capacitor 440 has become discharged.

After the cam 362 has rotated one-half revolution, one of the rollers 372 is received within one of the notches 364 so that power is disconnected from the advance motor 36 and further rotation thereof and advance of the film ceases after a one frame length advance.

Closing of the stepping switch pulse switch 380 occurs concurrently, as previously described, during rotation of the cam 362 to complete a D.C. circuit to the stepping switch single step unit 401 which advances the wiper of the stepping switch 395 one position.

As previously mentioned, immediately after the exposure has been completed, the charge level of the power pack 58 drops below the predetermined level necessary for energization of the flash sensor relay 412 with the result that the potential across the capacitor C2 is insufficient to cause a current flow through the resistor R10 and the sensor relay 412a sufficient to operate that relay. Thus, the contacts 412a open thereby disconnecting the ready light relay 86 from the D.C. supply so that the ready light 85 will go out, giving an indication to the operator that the camera is not yet ready for the taking of a subsequent photograph. If the operator should nonetheless attempt to operate the trigger rod 74, the circuit through the tripper release relay 436 in series with the currently open contacts 312a of the sensor relay cannot be completed with the result that no exposure can be taken. In this manner exposure of film under inadequate lighting condition is effectively prevented. As soon as the power pack 59 has recharged, the contacts 412a will close and another exposure will be made.

As previously described, the camera automatically prevents further exposure of film after a predetermined number of exposures (in the preferred embodiment, thirty-six exposures) have been completed in order to avoid overfilling of the cassette 248 with film. After the operator has taken the 36th exposure, a further frame length of film will be advanced and the stepping switch will be advanced to the 37th position, in the manner described above. In the 37th position of the stepping switch 395, the wiper arm 400 is no longer connected in serise with the D.C. supply, with the result that the shutter circuit through the trigger 82 and the trigger release relay 436 to actuate the shutter solenoid 170 and motor pulse relay 442, can no longer be completed by pressing the trigger rod 74. Thus, at this time, further exposures of the film and advance thereof into the cassette are automatically prevented so that the cassette may not become overloaded with film. It will then be apparent to the operator that the full cassette should be removed from the camera.

The first action of the operator in unloading the cassette is to unthread the locking pin 300. As the locking pin moves out of contact with the operating arm of the automatic film advance switch 390, the movable connector 390c thereof contacts the fixed connection 390b causing the capacitor 438 to discharge through the transport pulse relay 442 for a sufficient period of time to advance the film two frame lengths, as previously described. This ensures that the last exposed frame, and one blank frame of unexposed film sufficient for processing, are advanced automatically into the cassette without any need for the operator to remember to do so mentally.

As the advance motor 360 rotates the cam 362 through two half revolutions, the stepping pulse switch 380 also operates twice, thus causing the stepping switch advance single step unit 401 to advance the wiper 400 by two positions.

The operator next rotates the cover 292. At the commencement of rotation, the free extremity of the sensing arm of the transport interlock switch 393 moves out of the notch 394 in the outer sleeve 384, thus opening the contacts of the switch and disconnecting the advance motor 360 from the source of power so that inadvertent film advance is automatically prevented after the cover has been rotated from the terminal position thereof.

Rotation of the cover 292 to the entry position rotates the sleeve 284 as described with the result that the cutting edge 288 severs the exposed film in the cassette 248 from the unexposed film remaining in the camera and, at the same time, closes the opening 274 to provide a light-tight enclosure about the inner housing 266, thus shutting off any subsequent ingress of light to the exposed film after the cassette is removed. Movement of the cover 292 also causes the openings 320 and 322 of the cassette outer and inner housings to be relatively rotated out of coincidence, thus providing a lighttight housing about the severed exposed film in the cassette 248. The cover 292 is then removed, and the projection 317 on the outer casing 308 of the cassette 248 is then in alignment with the groove 282 permitting the cassette to be slid outwardly of the camera.

As the cover 292 is removed, the spring-loaded take-up drive shaft 244 urges the cassette partially out of the housing 266 so that it may more easily be removed by the operator.

Removal of the cassette 248 opens the contacts of the cassette sensor switch 386 thus further breaking the power connection to the motors.

It is frequently necessary, in using a hospital identification camera, to remove the cassette when a number of frame lengths of film of less than the full capacity of the cassette 248, have been produced. In this case, it is necessary that the stepping switch 395 be returned to the same position after the cassette has been removed that it would occupy if the cassette had been full when removed, in order that the stepping switch should start from the same point in its cycle each time a fresh cassette is inserted. For this purpose, the previously described reset switch 388 is included. When the cassette is removed from the camera, the contacts of the stepping switch reset switch 388 complete a D.C. circuit to the stepping switch reset unit 402 to move the wiper to the fortieth position.

It will be seen that the cassette unloading operation described permits film to be removed from the camera after any number of exposures of film up to or less than the maximum predetermined number of exposures have been completed, and that, in any event, the last exposed frame of film and one blank frame length of film thereafter will be advanced into the cassette. In this manner, the operator is not required in any way to count frames or to advance film himself in order to ensure that the last exposure is wound into the cassette and also that an adequate length of blank film for processing is provided. Moreover, overfilling of the cassette is automatically prevented after the maximum number of exposures have been completed.

After a filled cassette 248 has been unloaded as described above, an empty cassette is inserted into the inner housing 266. The body 294 of the cover 292 is then slid into the housing 266 with the pin 299 being received in the groove 282. As the outer body 298 seats upon the support plate 262, the contacts of the reset switch 388 are opened thus disconnecting the stepping switch reset unit 402 from power. At the same time the pin 299 enters both the radial slot 280 in the inner housing 266 and the aperture 290 in the sleeve 284. Also, the boss 318 on the cassette enters the hole 319 provided on the end face of the boss 296 of the cover 292.

The cover 292 bears on the cassette 248 to press the cassette into contact with the cassette sensor switch 386 thus closing the contacts of that switch to complete part of the series circuit to the take-up and advance motors 382 and 360.

The cover 292 is then rotated from the entry position to the terminal position thereof thus engaging the pin 299 in the slot 280 against axial withdrawal therefrom and securing the cover to the inner housing 266. At the same time the sleeve 284 and the inner housing 314 of the cassette are rotated to their open positions so that film may subsequently be advanced into the cassette. As the outer sleeve 284 reaches the fully opened position, the arm 393 of the advance interlock switch 392 seats in the notch 394 permitting the contacts of the transport interlock switch 392 to close thereby completing a portion of the series power circuit to the motors.

The locking pin 300 is then threadedly engaged with the aperture 301 so that the right extremity of the locking pin 300 contacts the automatic film advance switch 390 to close the connection 390a and open the connection 390b. As previously described, the capacitor 448 then charges thus permitting flow of current through the transport pulse relay 442 for a sufficient period of time to permit the advance motor to advance one frame length of film into the cassette. As the film is advanced, the take-up motor 382 rotates the spool so that the projections 350 engage the sprocket holes in the advancing length of film to engage the film with the spool.

In this manner, film is automatically advanced into the cassette without any need for the exercise of manual skill by the operator and additionally a sufficient length of blank film is provided to enable subsequent automatic processing to be successfully employed.

Operation of the cam 362 for one-half revolution causes the stepping switch pulse switch 380 to actuate the stepping switch single step solenoid 401 to advance the stepping switch one position from the fortieth position to the first position. The camera is then in condition to take further photographs with the film engaged on the spool within the cassette and the stepping switch set 395 to commence its predetermined number of sequential operations.

Although the invention is described with reference to the preferred embodiment, it will be apparent to those skilled in the art that additions, deletions, modifications, substitutions, and other changes not specifically described and illustrated in the preferred embodiment may be made which will fall within the purview of the appended claims.

We claim:
1. A camera for producing successive exposures on a strip of photographic film, comprising:
 a housing,
 film supply means positioned within said housing,
 a film receiving container removably positioned within said housing for receiving film from said supply means,
 means for releasably securing said container within said housing,
 means for advancing the film from said supply means toward said container, and
 means for actuating said advancing means upon operation of said securing means prior to removal of said container to advance into said container a length of film sufficiently long to assure that the last exposed portion of the film will be located within the container.
2. A camera according to claim 1 further including:
 means for severing the film from that portion of the film located within said container, said means sever- ing the film upon operation of said means securing said container after the length of film including the last exposed portion of the film has been advanced into the container.

3. A camera according to claim 1 further including:
means for sensing the presence of said container within said housing, said means connected with said means for advancing film for preventing operation thereof in the absence of said container, whereby film advance in the absence of said container is prevented.

4. A camera according to claim 1 wherein:
the longitudinal distance between one lateral edge of one exposure on the strip of photographic film and the corresponding lateral edge upon the next successive exposure is of uniform length defining one frame length,
said advancing means advancing at least the last previously exposed frame length of film and a further portion of film thereafter into said container upon operation of said securing means prior to removal of said container from said housing.

5. A camera according to claim 1 further including:
second actuating means for actuating said advancing means to advance a leading portion of film into said container upon operation of said securing means to secure said container within said housing.

6. A camera according to claim 1 wherein:
said means for securing said container within said housing includes,
means for releasably holding said container within said housing,
means for releasably locking said holding means against release thereof,
said actuating means actuating said advancing means upon operation of said locking means prior to permitting release of said holding means.

7. A camera according to claim 1 further including:
means for severing the film from that portion of the film located within said container upon release of said securing means prior to removal of said container from said housing,
means for providing a lighttight enclosure about that portion of the film within said container upon operation of said severing means, and
means for preventing the passage of light between the film within said housing and that portion of said housing occupied by said container,
whereby after release of said securing means said container and the exposed film contained within it may be removed from said housing without further exposure of the film to light.

8. A camera according to claim 1 wherein said housing includes:
separable first and second bodies,
said first body containing said film supply means, said film container and that portion of the film extending between said film supply means and said container,
said second body containing exposure producing means for producing exposures on a part of that portion of the film extending between said film supply means and said film container.

9. A camera according to claim 2 further including:
means for providing a lighttight enclosure about that portion of the film located within said film container upon operation of said means for severing the film, and
means for preventing the passage of light between the film within said housing and that portion of said housing occupied by said container upon operation of said means for severing said film,
whereby the portions of the film within said housing and said container are protected against exposure to light after operation of said means for severing the film.

10. A camera according to claim 9 further including:
second actuating means for actuating said advancing means to advance a leading portion of film into said container upon operation of said securing means to secure said container within said housing,
said means for providing a lighttight enclosure about said container and said means for providing the passage of light between the film within said housing and that portion of said housing occupied by said container including openings aligned upon operation of said securing means to secure said container within said housing so as to permit the film to enter said container.

11. A camera for producing successive exposures on a strip of photographic film, the longitudinal distance between one lateral edge of an exposed portion of the film and the corresponding lateral edge of the next longitudinally successive portion of the exposed film defining one frame length, the camera being connected to a source of power, said camera comprising:
a housing,
shutter means for producing one exposure on the film on each operation of said shutter means,
a film container removably positioned within said housing for receiving that portion of the film exposed by said shutter means, said container having a maximum film length capacity of a predetermined number of frame lengths of film,
power operated advancing means for advancing one frame length of the film upon each operation of said shutter means,
sequentially operable, shutter control means responsive to successive operations of said shutter means for preventing further operation of said shutter means upon completion of a predetermined number of operations including an initial operation of said shutter means, said predetermined number of operations being less than the number of said predetermined number of frame lengths defining the maximum length capacity of said container,
whereby overfilling of the container in excess of the film length capacity thereof is automatically prevented.

12. A camera according to claim 11 further including:
means for releasably securing said container within said housing, and
shutter control reset means for placing said shutter control means in condition for the initial operation thereof upon release of said securing means.

13. A camera according to claim 11 further comprising:
electrically operated illumination apparatus, stored electrical charge means connected with said illumination apparatus and with said shutter means, said stored electrical charge means being discharged through said illumination apparatus to provide a momentary operation thereof upon each operation of said shutter means, said stored electrical charge means being connected to said source of power for recharging said stored charge means, and
charge level sensor means responsive to the charge energy level of said stored charge means, said charge level sensor means being operatively connected with said shutter means for permitting operation of said shutter means only upon said stored charge means attaining a predetermined level of charge.

14. A camera for producing successive exposures on a strip of photographic film wherein the camera is of the type adapted to produce on each successive exposed portion of the film an image of an object and a reproduction of a portion of a card having thereon indicia identifying the image on that exposed portion of the film, said camera comprising:
a housing,
a selectively actuatable shutter connected with the housing for producing an exposure on the film on each operation of said shutter, means transmitting light from the object to said shutter, a holder connected with said housing adapted to receive the card for supporting the card in a position for reproduction of the card on the next exposed portion of film along with the image of the object, card sensing means connected with said holder for sensing the presence of the card received within said holder, and electrical control means operatively connected with said card sensing means and said shutter for preventing operation of said shutter in the absence of the card.

15. A camera according to claim 14 wherein each card is of asymmetrical geometric shape, said card holder including orientation stop means connected with said holder for permitting reception of the card within said holder in only one desired orientation of the card relative to said holder, whereby the identifying indicia on the card may be oriented relative to the camera in a suitable position for reproduction on the next exposed portion of film.

References Cited

UNITED STATES PATENTS

| | | | |
|---|---|---|---|
| 2,357,674 | 9/1944 | McConnell et al. | 88—24 |
| 3,010,361 | 11/1961 | Pfaff | 88—24 |
| 3,237,514 | 3/1966 | Dougan et al. | 88—24 |

NORTON ANSHER, Primary Examiner

RICHARD A. WINTERCORN, Assistant Examiner

U.S. Cl. X.R.

95—12, 31; 352—75